No. 790,496. PATENTED MAY 23, 1905.
J. GRAFF.
BEVEL AND SQUARE.
APPLICATION FILED MAR. 30, 1904.
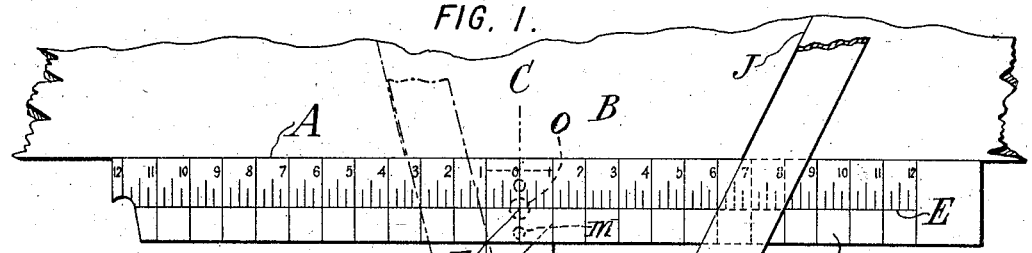
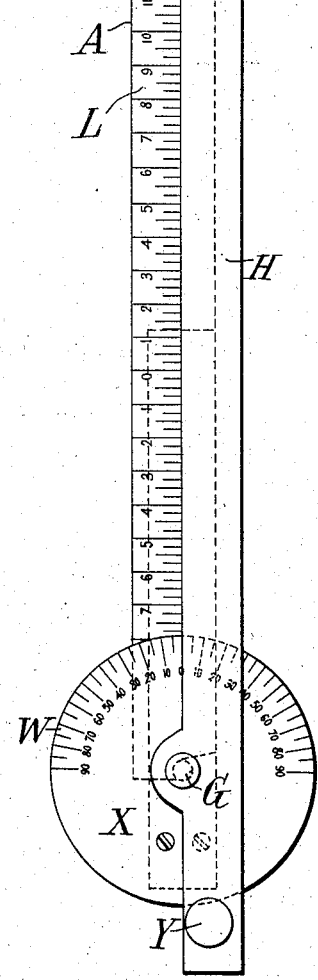
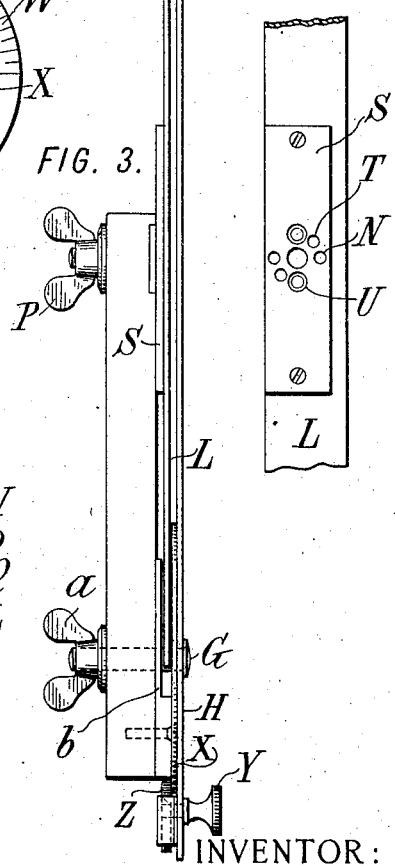
WITNESSES:
Fred White
René Muine
INVENTOR:
Jacob Graff,
By Attorneys,
Arthur E. Fraser & Co.

No. 790,496.

Patented May 23, 1905.

UNITED STATES PATENT OFFICE.

JACOB GRAFF, OF NEW YORK, N. Y.

BEVEL AND SQUARE.

SPECIFICATION forming part of Letters Patent No. 790,496, dated May 23, 1905.

Application filed March 30, 1904. Serial No. 200,703.

*To all whom it may concern:*

Be it known that I, JACOB GRAFF, a citizen of the United States, residing in the borough of Bronx, city, county, and State of New York, have invented a certain new and Improved Bevel and Square, of which the following is a specification.

This invention aims to provide an improved tool for laying off angles in various kinds of work, such as the making of templets or patterns or in any roofing, carpentering, or similar work. In my Patent No. 753,064, dated February 23, 1904, I have described a tool for a similar purpose, and the present invention provides certain improvements over said tool. Prior to these inventions the common method of laying off an angle to which, say, the end of a board is to be cut has been to lay off on the floor or some other convenient place a right-angle triangle, of which the two sides represent the components of the angle to be laid off. The carpenter's bevel was then arranged so that its bevel blade coincided with the hypotenuse of the triangle and was then laid against the work so as to transfer the angle thereto. With these tools which I have invented the tool has what I call a "square" blade, which is placed directly against the edge of the work, and a "bevel" blade, which extends over the face of the work. The tool has also a scale arranged at a standard distance in advance of the pivotal point of the bevel blade. Supposing this standard distance to represent twelve inches, there is a scale marked in twelfths and subdivisions thereof, which represent inches and fractions of an inch, and when the edge of the bevel blade is brought into coincidence with a division on the scale it at once extends over the face of the work at an angle whose components are respectively the distance on the scale and the standard distance. For example, if the bevel blade crosses the scale at a point marked "3" then the angle laid out is three in twelve, or three inches in a foot. This is the most common way of indicating angles in these arts, and therefore the tool works without calculation or previous laying out on a separate drawing-board. An angular scale may also be provided.

A particular form of improvement in the present invention is the arranging of the blade so that it may swing freely over the scale from end to end.

Various other points of improvement are noted in detail hereinafter.

The accompanying drawings illustrate a tool embodying the invention.

Figure 1 is a plan of the same, showing it applied to the work. Fig. 2 is a plan, and Fig. 3 an edge view, showing the tool folded for convenient carrying. Fig. 4 is a section of a locking device. Fig. 5 is an under side plan of the central portion of the square blade.

The end of the bevel-blade is broken off, being too long to be shown within the limits of the drawings. It is to be understood that it extends a suitable distance over the work to draw the longest lines required.

Referring to the embodiment of the invention illustrated, the tool is provided with a straight forward edge A, which in use is brought up against the edge of the work B and extends at right angles to and preferably on both sides of the line C D normal to the edge of the work and which I designate as the "longitudinal" axis of the tool. A scale marked on the line E (which is preferably a true linear scale showing rectangular components of the bevel to be laid off) is at a standard distance F G from the pivotal center of the bevel blade H, the scale being marked in fractions of said standard distance, these fractions being either uniform or varying, depending upon whether the scale is to indicate rectangular components or to indicate the angle in degrees and depending also upon the position and direction of the line E along which the scale is marked. The bevel blade H extends over the scale E and over the work B. The line J marked on the work along the edge of the bevel blade H will obviously give a bevel corresponding with the ratio of the portion of the scale from F to the edge of H to the standard distance F G six to twelve, or six inches to the foot in the present case. The bevel blade H swings freely over the scale E from one end to the other, and the latter extends on both sides of the longitudinal axis C D, preferably of equal distance at each side for miscellaneous work, and the tool may therefore be used to lay off an angle in either direction with equal facility. The working edge of the bevel blade H is on a line passing through its pivotal point G, and the zero-point of the scale E is at the point F on the longitudinal axis, so that with a uniform subdivision of the scale E the tool is equally accurate for all angles.

The body of the tool is preferably an elongated member or bar K of sufficient length to carry at its outer end the square blade L a suitable distance from the pivotal point G of the bevel blade. The square blade need be only sufficiently large to carry the scale E and to be stiff and strong and is preferably pivoted at the end of the body K, so that when the tool is not in use it may be swung into substantial coincidence with the body, as indicated in Figs. 2 and 3. The square blade is entirely above the body K, so that there is no obstruction to the free swinging of the bevel blade H from end to end of the scale.

Means are provided for clamping the square blade in its operative position, and preferably also a lock or latch is provided for determining this position with accuracy and quickness. For this purpose a pair of spring-pins M are carried in the end of the body K, and a pair of apertures or depressions N are provided on the under side of the blade L. As the blade is swung about its pivot to its right-angle position the points of the pins M enter the depressions N. Only the points of the pins enter the depressions, the bodies of the pins being too large. Thus the blade is held exactly in position. In order to clamp it firmly in this position, so that it may be handled more or less roughly, the pivot-pin O carries a thumb-nut P on its lower end. In order to lift the blade L free from the pins M, a spring Q is provided, which presses the blade outward as soon as the thumb-nut P is unscrewed. Screws R serve to hold the pins and their springs in place and to regulate the stiffness of the spring-pressure. In order that the clamping and locking means described shall not interfere with the freedom of movement of the bevel blade H over the face of the square blade L, the latter is provided near its pivotal point with an extra plate S on its under side in which are formed the depressions N and the socket for the pivot-pin O. A point of value also is the provision of means for accurately and quickly locating the square blade L at an angle of forty-five degrees with the body K. With the square blade arranged at this angle and the bevel blade arranged with its operative edge in line with the longitudinal axis C D we have at once two forty-five-degree angles, one "inside" angle and the other an "outside" angle, and by placing the edge of the square blade against the work we can trace these angles at once upon the face of the work. As this is an angle which is most frequently used, the utility of this feature is clear. For the purpose of locating the square blade in its forty-five-degree position a second pair of apertures or depressions T are formed in the under side of the square blade, or, to speak more strictly, in the plate S, these depressions T being at an angle of forty-five degrees to the depressions N, as will be readily understood. Larger apertures or depressions U are also provided into which the pins M spring when the tool is folded, as in Fig. 2. No accuracy or close fit is required here, the apertures being merely for the purpose of resting the springs which push out the pins M. A line V is preferably marked on the body at an angle of forty-five degrees. It is only necessary then to turn the square blade L until its rear edge coincides approximately with the line V and then to screw up the thumb-nut P, when the blade will be drawn down and at the same time swung around by the pins M to bring it accurately into position. Preferably, also, an angular scale W is provided having its center at the pivotal point G of the bevel blade. By this means not only can any desired angle be laid off quickly, but a workman can determine at a glance what is the rectangular component which corresponds with any desired angle. This provides also a quick means of checking the correctness of the work where both the angle (in degrees) and the rectangular components are stated. The plate X, upon which the angular scale is carried, is preferably extended to form a complete circle, as shown, and the rear portion is utilized in the clamping of the bevel blade H. The latter is provided at a point adjacent to the circular plate X with a thumb-screw Y, engaging a bolt Z, which extends under the circular plate X. The unscrewing of the screw Y permits a free movement of the bevel blade, and the turning of the screw in the opposite direction pinches the edge of the disk X between the bevel blade and the bolt Z. Any suitable style of pivot-pin may be used for the bevel blade. I preferably provide a thumb-nut $a$ at one end of said pin G, so that when the tool is folded with the end of the square blade L between the disk X and the body of the tool the parts may all be clamped tightly together by turning the nut. A spacing-plate $b$ is preferably provided of approximately the same thickness as the plate S. In unfolding the tool for use the nut P is loosened and the square blade turned until it comes to its proper position, after which the nut P is tightened to hold it in place. Similarly, in folding the tool the nut P must be loosened before the square blade can be swung from one position to another.

The scale E might be longer than shown; but this is not necessary. In order to get an angle greater than forty-five degrees—say, for example, an angle of twelve inches in six—the blade will be clamped in the position shown and the edge of the body K will be laid against the edge of the work.

Though I have described with great particularity of detail certain apparatus embodying the invention, yet it is not to be understood therefrom that the invention is limited to the particular embodiments disclosed. Various modifications thereof in details and in the arrangement and combination of the parts may be made by those skilled in the art without departure from the invention.

What I claim is—

1. A tool for laying off angles, said tool having a longitudinal axis and having a member with a straight uninterrupted forward edge adapted to extend at right angles on both sides of the longitudinal axis, and which may be held against the edge of the work upon which the angle is to be laid off, and said member carrying a scale adjacent to said forward edge, means for locating and fixing said member in such right-angle position, and a bevel blade pivoted to swing about a fixed point on said axis which point is at a standard distance from said scale, the scale being marked in fractions of said standard distance, the bevel blade bearing directly upon and extending over the scale and beyond the forward edge of the tool a sufficient distance to lay off a line of considerable length on the work and adapted to swing over the scale freely from end to end, whereby when the forward edge of the tool is held against the edge of the work the bevel blade extends over the work and permits the drawing of a line thereon at an angle indicated upon the said scale.

2. A tool for laying off angles, said tool having a longitudinal axis and having a member with a straight uninterrupted forward edge adapted to extend at right angles on both sides of the longitudinal axis, and which may be held against the edge of the work upon which the angle is to be laid off, and said member carrying a scale adjacent to said forward edge, means for locating and fixing said member in such right-angle position, and a bevel blade pivoted to swing about a fixed point on said axis, which point is at a standard distance from said scale, the scale being marked in fractions of said standard distance, the bevel blade bearing directly upon and extending over the scale and beyond the forward edge of the tool a sufficient distance to lay off a line of considerable length on the work, swinging freely over the scale, and having an edge the line of which passes through its pivotal point, whereby when the forward edge of the tool is held against the edge of the work the bevel blade extends over the work and permits the drawing of a line thereon at an angle indicated upon the said scale.

3. A tool for laying off angles comprising in combination a body, a square blade attached at a fixed point thereto adapted to extend at right angles on both sides thereof, and having its forward edge projecting at least as far as the forward end of the body, whereby it may be held against the edge of the work upon which the angle is to be laid off, means for locating and fixing the square blade in such right-angle position, and a bevel blade pivoted to said body at a fixed standard distance from the point of attachment of the square blade, bearing directly upon and extending over and beyond the square blade a sufficient distance to lay off a line of considerable length on the work, and swinging freely over the face thereof, the square blade carrying a scale in fractions of said standard distance and having an unobstructed face so that the bevel blade can be swung over it continuously from end to end, whereby when the forward edge of the tool is held against the edge of the work the bevel blade extends over the work and permits the drawing of a line thereon at an angle indicated upon the said scale.

4. A tool for laying off angles comprising in combination an elongated body K, an elongated square blade pivoted at an intermediate point of its length to said body, so that it may be turned to substantially coincide therewith or to stand at right angles thereto with its ends projecting on both sides of said body, said square blade having its forward edge projecting at least as far forward as the end of the body, whereby it may be held against the edge of the work upon which the angle is to be laid off, means for locating and clamping it in the right-angle position, a bevel blade pivoted to said body at a fixed standard distance from the square blade and bearing directly upon and extending over the square blade a sufficient distance to lay off a line of considerable length on the work, and swinging freely over the face thereof, the square blade carrying a scale in fractions of said standard distance, and the square blade having an unobstructed face so that the bevel blade can be swung over it continuously from end to end, whereby when the square blade is held against the edge of the work the bevel blade extends over the work and permits of drawing a line thereon at an angle indicated upon the said scale.

5. A tool for laying off angles, comprising in combination a body, a square blade pivoted thereto, a spring-controlled device on one of said members adapted to engage the other when the blade is turned to a desired angular position relatively to the body, and a bevel blade pivoted to said body at a standard distance from the point of attachment of the square blade and extending over the face thereof, the square blade carrying a scale in fractions of said standard distance.

6. A tool for laying off angles, said tool having a longitudinal axis and having a member with a straight uninterrupted forward edge adapted to extend at right angles to the longitudinal axis, and which may be held against the edge of the work upon which the angle is to be laid off, and said member carrying a linear scale adjacent to said forward edge, means for locating and fixing said member in such right-angle position, a bevel blade pivoted to swing about a fixed point on said axis, which point is a standard distance from said linear scale, the linear scale being marked in fractions of said standard distance, the bevel blade bearing directly upon and extending over the scale and beyond the forward edge of the tool a sufficient distance to lay off a line of considerable length on the work, and an angular scale the center of which is the pivotal point of said bevel blade and over which said bevel blade also extends, whereby when the forward edge of the tool is held against the edge of the work the bevel blade extends over the work and permits the drawing of a line thereon at an angle indicated in rectangular components upon said linear scale, and in degrees upon said angular scale.

7. A tool for laying off angles, said tool having a longitudinal axis and having a member with a straight uninterrupted forward edge adapted to extend at right angles to the longitudinal axis, and which may be held against the edge of the work upon which the angle is to be laid off, and said member carrying a scale adjacent to said forward edge, means for locating and fixing said member in such right-angle position, a bevel blade pivoted to swing about a fixed point on said axis, which point is a standard distance from said scale, the scale being marked in fractions of said standard distance, the bevel blade bearing directly upon and extending over the scale and beyond the forward edge of the tool a sufficient distance to lay off a line of considerable length on the work, and adapted to swing over the scale freely from end to end, whereby when the forward edge of the tool is held against the edge of the work the bevel blade extends over the work and permits the drawing of a line thereon at an angle indicated upon the said scale, a circular plate lying under a portion of said bevel blade, and a clamp carried by said bevel blade and passing around the edge of said plate and adapted to grip the latter at any desired point in order to clamp the blade.

8. A tool for laying off angles, comprising in combination an elongated body K, an elongated square blade L having a straight forward edge and carrying a scale, said blade L being pivoted to said body K at an intermediate point of its length whereby it may be turned to substantially coincide with said body or to stand at any desired angle relatively thereto, a bevel blade H pivoted to said body at a fixed standard distance from said scale and extending over and swinging freely over the face thereof, said scale being marked in fractions of said standard distance, a clamp for clamping the bevel blade in any desired position, and a locking device acting to automatically lock the square blade when it is at right angles to the body or at forty-five degrees to the body.

In witness whereof I have hereunto signed my name in the presence of two subscribing witnesses.

JACOB GRAFF.

Witnesses:
 DOMINGO A. USINA,
 THEODORE T. SNELL.